United States Patent [19]

Kawakami et al.

[11] Patent Number: 4,803,496
[45] Date of Patent: Feb. 7, 1989

[54] METHOD FOR RECORDING A COLOR IMAGE

[75] Inventors: Haruko Kawakami, Funabashi; Hidekazu Sekizawa, Yokohama; Naofumi Yamamoto, Tokyo, all of Japan

[73] Assignee: Kabushiki Kaisha Toshiba, Kawasaki, Japan

[21] Appl. No.: 879,943

[22] Filed: Jun. 30, 1986

[30] Foreign Application Priority Data

Jun. 28, 1985 [JP] Japan ................. 60-142150

[51] Int. Cl.$^4$ ............................. G01D 15/00
[52] U.S. Cl. ................. 346/76 PH; 346/106; 400/240.4
[58] Field of Search ............. 346/157, 1.1, 76 PH, 346/106; 358/316, 27, 80, 284, 283, 298; 400/120, 240, 240.4

[56] References Cited

U.S. PATENT DOCUMENTS

4,683,492 7/1987 Sugiura et al. ............. 358/80

Primary Examiner—Arthur G. Evans
Attorney, Agent, or Firm—Oblon, Fisher, Spivak, McClelland & Maier

[57] ABSTRACT

A method of recording a full color image, for use in a printer such as a thermal printer, by means of a plurality of color inks of such as yellow, cyan, and magenta, and a black ink which is to be printed in an area in which the color inks are superimposed. For black area compensation the black ink is printed in an area smaller than an area in which the color inks are superimposed and which is obtained through the Neugebauer equation.

5 Claims, 6 Drawing Sheets

METHOD FOR RECORDING A COLOR IMAGE

BACKGROUND OF THE INVENTION

This invention relates to a method for recording a color image and, in particular, a method for recording a full-color image in a color reproduction apparatus using black ink.

A thermal color printing system records a color image by superimposing a plurality of color inks on a recording medium. This system uses a color sequential recording technique, according to which a first color separation image is printed on the recording medium with a yellow ink, a second color separation image on the resultant image with a magenta ink and subsequently a third color separation image on the resultant image with a cyan ink.

A full color image thus printed contains areas printed with a single color ink and areas in which two or three color inks are superimposed. Particularly, black is represented by superimposing all three color inks. Since, however, light-transparent inks are used for thermal printing, it is not possible to realize a perfect black.

In order to realize a perfect black, a full color printing system is considered which uses a black ink. This system permits a ready reproduction of a perfect black color. This system permits a ready reproduction of delicate color tones and thus a reproduction of shadow details.

Figure 7:
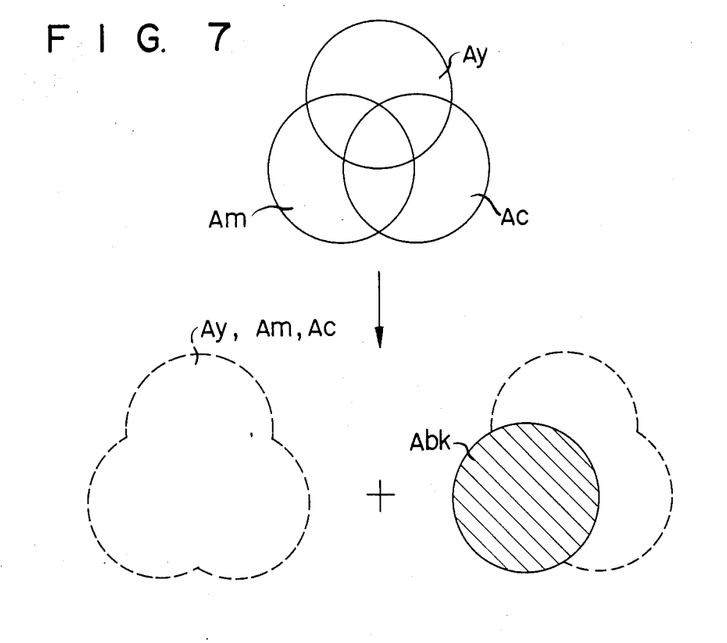
FIG. 7 is a diagram for explaining a conventional UCR method.

Conventionally, a UCR (under color removal) method is known for a color printing technique using a separate black ink. According to this method, black areas that would result from the superimposition of the reference color inks is predicted, and the predicted areas are printed simply by black ink. As shown in FIG. 7, for example, with Ay representing a yellow portion, Am representing magenta portion, and Ac representing a cyan portion in the unit pixel, a pixel must be represented as black if these portions are equal in area to each other. For this reason, the portion indicated as Abk in FIG. 7 is printed with black ink. According to this method it is possible to use an inexpensive black ink for printing.

The use of the UCR method in a thermal printer, however, does not allow good transfer of a black ink to a recording medium. This is caused by the characteristic of a full color image as well as the principle of a thermal color printing.

In general, in a full color image a black portion is not isolated in a colorless background. Namely, the black portion is in intimate contact with other color portions. In order to print a colored image by the UCR method, three color inks are properly superimposed on portions other than black portions, and the black portions remain as yet unprinted. The blank ink is then transferred onto those portions of a recording medium which have been left as unprinted.

A color image with the three-colors of ink is formed before the transfer of the black ink, thus resulting in a rise of a portion on which color inks are transferred relative to a portion where no ink transfer is made on the surface of a recording medium. Black ink is less easily transferred due to the creation of such a rise, meaning that a phenomenon occurs where the black ink remains unprinted on the portions intended to be printed.

In thermal printing, poor ink transfer, if any, adversely affects the quality of a printed image. The UCR method is not desirable for thermal color printing. For this reason, black ink is usually further printed in portions on which the three color inks have been already superimposed.

In the conventional four-color based full color thermal printing system, the image contrast is improved due to the addition of black ink. However, a printed color image becomes adversely darkened, resulting in the degradation of color balance.

SUMMARY OF THE INVENTION

An object of this invention is to provide an improved full color image printing method.

Another object of this invention is to provide a four color-based color image printing method which can suppress the lowering of the color saturation and the color balance due to the additional use of a black ink.

DETAILED DESCRIPTION OF THE PREFERRED EMBODIMENTS

This invention will be explained below by way of an example of a thermal transfer type color image reproduction apparatus.

Figure 1:
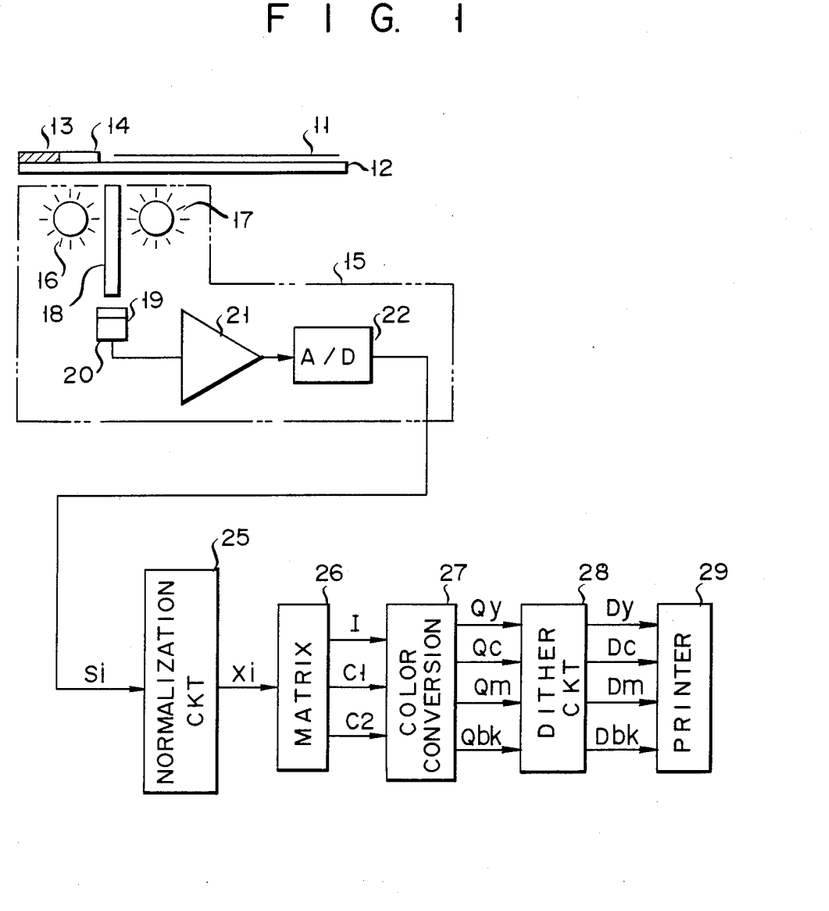
FIG. 1 is a block diagram of a thermal transfer type color reproduction apparatus according to one embodiment of this invention.

Referring to FIG. 1, a color reproduction apparatus according to one embodiment of this invention includes a glass plate 12 on which a color document 11 to be copied is placed. A black reference plate 13 and white reference plate 14 are placed at one end of glass plate 12. Image information on color document 11 is read out by an image readout section 15 which is disposed below glass plate 12 and which is movable in a direction indicated by an arrow in FIG. 1.

Image readout section 15 comprises light sources 16, 17, located below glass plate 12 in a parallel array to illuminate the document, rod lens array 18 placed between light sources 16 and 17, solid image sensor 20 equipped with a color filter array 19 for converting light beams reflected from the color document through rod lens array 18 to electrical signals, amplifier 21 amplifying an output signal from the image sensor, and A/D converter 22 converting an output signal of the amplifier to a digital signal.

In operation, at a first stage, image readout section 15 is moved to a position of black reference plate 13 to read out a light beam reflected from black reference plate 13. At this time light sources 16 and 17 may or may not be lit up.

Color filter array 19 comprises color filter elements of R (red), G (green), and B (blue), or Y (yellow), G (green) and C (cyan). A black reference signal Bi corresponding to the light beam reflected from black reference plate 13 is read out of image readout section 15 and supplied to a normalization circuit 25 where it is held to normalize color signals. When light sources 16 and 17 are extinguished at this time, they are lighted up and image readout section 15 is moved to a position corresponding to white reference plate 14 where it reads out a light beam reflected from white reference plate 14. Similarly, a white reference signal Wi is supplied to normalization circuit 25 where it is held for normalizing color signals. After this preparatory stage, color document 11 is read out.

Normalization circuit 25 normalizes a read image signal Si to compensate for a light distribution of light sources 16, 17, a variation in the characteristic of color filter array 19 and a variation in the sensitivity of solid image sensor 20.

The image signal Si is normalized by normalization circuit 25 according to an equation given by $$Xi = (Si - Bi)/(Wi - Bi) \tag{1}$$

From this equation it will be understood that $Xi = 1$ for the white reference signal and $Xi = 0$ for the black reference signal.

The normalized signal Xi from normalization circuit 25 is supplied to a matrix circuit 26 to be converted to a brightness signal I and color difference signals C1 and C2. These signals I, C1 and C2 are supplied to a color conversion circuit 27. Color conversion circuit 27 provides ink amount signals Qy, Qc, Qm and Qbk showing amounts of inks for yellow, cyan, magenta and black, respectively, which are employed to print each pixel of a color image.

The respective ink amount signal shows a density level of ink printed in a unit pixel. In a printer of a binary recording system the density of ink is represented as the number of ink dots in a unit pixel. That is, the ink amount is converted to an area factor of an ink corresponding to the number of ink dots within the unit pixel, noting that the area factor of ink is defined as a ratio of the area occupied by the ink to the area (unity) of a unit pixel. A conversion from the ink amount to the area ratio is achieved by a dither circuit 28.

According to the Neugebauer equation well known in this field of art, a respective color other than the reference colors (Y, M, C) is expressed as the superimposition of the reference colors.

Color conversion circuit 27 evaluates the area ratios Y, M, C of inks for yellow, magenta and cyan in the respective pixels from the brightness signal I and color differences signals C1 and C2 according to the Neugefauer equation and then evaluates amount signals Qy, Qm, Qc, and Qbk of inks proportional to the aforementioned area ratios Y, M and C. For this reason, color conversion circuit 27 may be comprised of ROMs storing data tables which are previously calculated to provide respective ink amount signals at a time from the brightness signal I and color difference signals C1 and C2. The respective ink amount signal has one of, for example, 32 (i.e., 0 to 31) levels.

According to this invention, a black ink amount signal Qbk is compensated for, in accordance with a procedure as set forth below.

Figure 2:
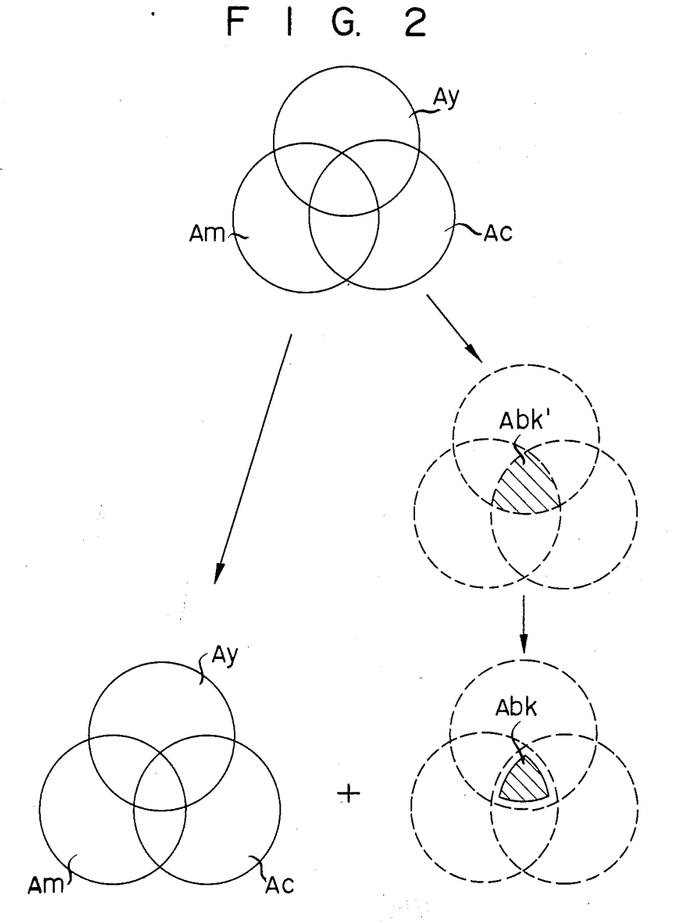
FIG. 2 is a schematic diagram for explaining a gradation compensation in the apparatus of FIG. 1.

Now assume that with Ay, Am, and Ac representing printing portions for yellow, magenta, and cyan, respectively, as shown in FIG. 2, and in a unit pixel the respective inks are printed in proportions as indicated in the same Figure. According to the invention, the black ink is printed at a portion where the three color inks are superimposed. In a case where an ink printing portion is not displaced a portion printed with the black ink may be a portion indicated by Abk' in FIG. 2. According to this invention, however, in view of the ink printing displacement, the black ink is printed on a smaller area Abk than the aforementioned area Abk' due to the compensation for the black ink area ratio. In this case, the area ratio BK for the black ink can be evaluated with the use of, for example, the Neugebauer equation.

That is, with Y, M and C representing area ratios for the respective color inks for yellow, magenta and cyan, the area ratio BK' for the black before the compensation is expressed as follows:

$$BK' = Y \times M \times C \tag{2}$$

In order to perform a black ink compensation, it is only necessary to evaluate $$BK = (BK')^n \tag{3}$$

where n may be a real number of 1 or more, preferably about 2. Equations (2) and (3) can be reduced to:

$$BK = Y^n \times M^n \times C^n \tag{4}$$

where $$0 \leq Y \leq 1$$

$$0 \leq M \leq 1$$

$$0 \leq C \leq 1$$

From this equation it is possible to directly evaluate the area ratio for the area-compensated black.

Figure 3:
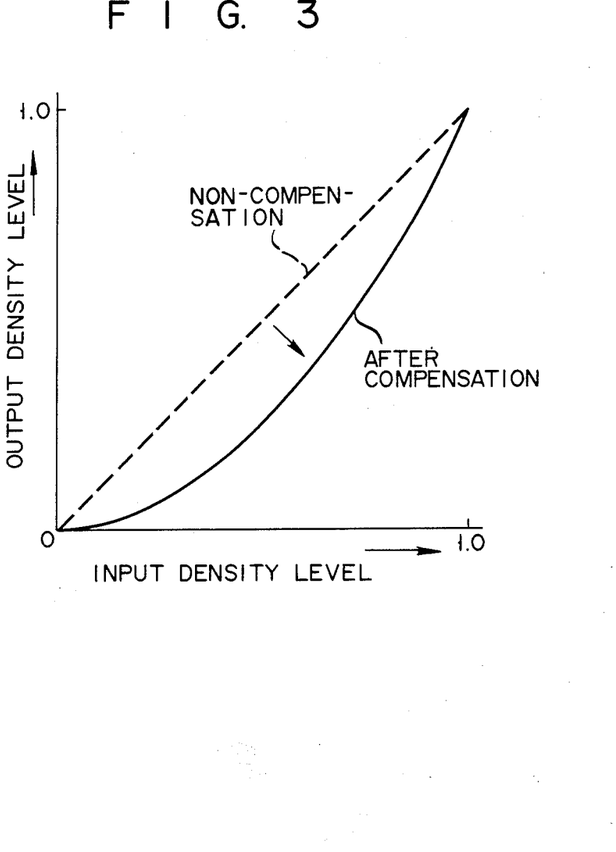
FIG. 3 shows a relation of an output density level to an input density level before and after the gradation compensation for a black ink in the apparatus of FIG. 1.

FIG. 3 is a view showing a relation of an output density level to an input density level before and after the black area compensation. In FIG. 3, the broken line denotes a black gradation characteristic before the compensation and solid line shows a black gradation characteristic after the compensation. According to this invention, the compensation is effected such that the lower the input density level, the lower the output density level. In this connection it is to be noted that the right-hand term of Equation (3) may be multiplied by a proper coefficient, as required. Respective ink amount signals Qy, Qc, Qm, and Qbk thus found are supplied to a bi-level quantizing dither circuit 28. The dither circuit effects bi-level quantizing of the ink amount signals Qy, Qc, Qm, and Qbk on the basis of their predetermined dither matrix patterns and delivers dithered dot data Dy, Dc, Dm, and Dbk to printer 29 which reproduces a full color image.

The black ink amount signal Qbk can be found from the following equation:

$$Qbk = (Qy/Qo \times Qn/Qo \times Qc/Qo)^n \times Qo$$

where Qo represents a saturation ink amount signal with the maximum level (31st level).

According to this invention, a high density black area is printed with the same amount of black ink as in the conventional manner and a low density black area is printed with a suppressed amount of black ink, thus preventing a lowering of the saturation in a printed image without impairing any sharpness of, for example, black characters or lines.

This method has an advantage over a "UCR" method.

Since the black ink is superimposed on the color inks this invention is suitable for application to a printing system such as a thermal transfer printing system, which would cause an ink transfer failure due to the thickness of printed color inks when using the UCR method. When the black ink is superimposed on color inks, which has an area ratio obtained by the UCR method, an adverse effect would result, in which a chromatic color may be turbid. According to this invention, because of the black ink transfer to a smaller area than the conventional method, the adverse effect due to the black ink transfer displacement would be reduced. Further, the conversion of achromatic color to chromatic color can be prevented so that a perfect black may be output. According to this invention, since a portion into which black ink is to be printed is set smaller than in the conventional method, three color inks need not be printed in that portion without causing any difficulty in the black ink transfer.

This invention is not restricted to the aforementioned embodiment.

That is, in the aforementioned embodiment the area ratio of a portion where the respective inks for yellow, magenta, and cyan are superimposed is evaluated through the Neugebauer equation, and then the result of this evaluation is compensated to provide a black ink amount. However, this invention is not restricted to this method of evaluation. The black ink amount may be evaluated from, for example, the number of dots in a pixel which are common to yellow, magenta, and cyan after dither conversion.

Figure 4:
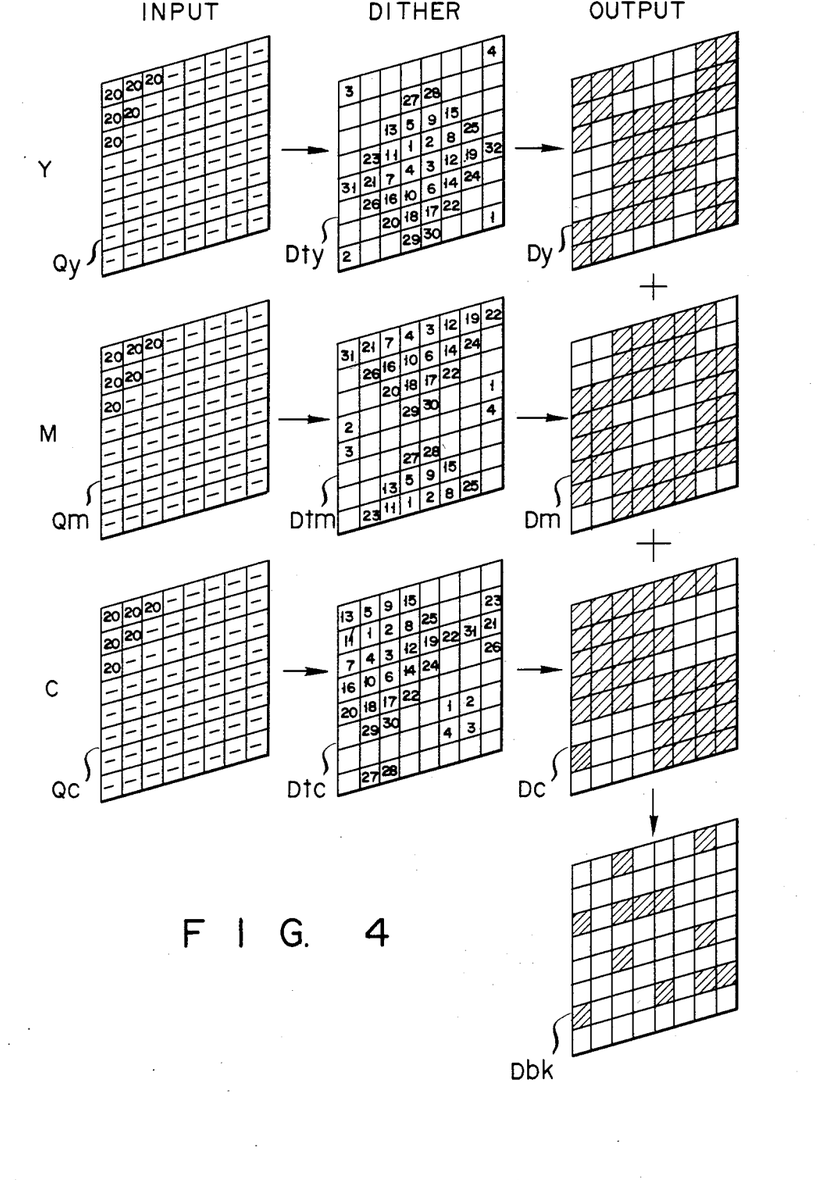
FIG. 4 is a schematic diagram showing a relation between dither patterns and outputs in a method for recording a color image according to another embodiment of this invention.

A method for evaluating an amount of black ink from organic dither patterns will be explained below with reference with FIG. 4. Let it be assumed that the number of gradation levels which can be output through a dither matrix is 32 and that ink amount signals $Q_y$, $Q_m$, and $Q_c$ for yellow, magenta, and cyan from the color conversion circuit each have a gradation level of "20". In this case, with the dither matrices $D_{ty}$, $D_{tm}$, and $D_{tc}$ for the unit pixel arranged as shown in FIG. 4 the dither pattern output for the respective inks are as indicated by $D_y$, $D_m$, and $D_c$, respectively. The dot data is represented by a hatched portion. Since, therefore, a portion to be printed with black corresponds to that printed with all the colors, i.e., that a portion in which the hatched portions overlap in the dither output patterns $D_y$, $D_m$, and $D_c$, a resultant pattern output will be as indicated by $D_{bk}$. If in this case $m'$ number of dot data is delivered, then the black ink area ratio $BK'$ before compensation can be evaluated by an equation given by $$BK' = m'/(m \times m) \quad (5)$$

where $m \times m$ stands for the size of the dither matrix. The transformation of $BK'$ to $BK$ may be carried out on the basis of Equation (3). In this embodiment the amount of black ink can be evaluated more accurately than in the aforementioned case.

Figure 5:
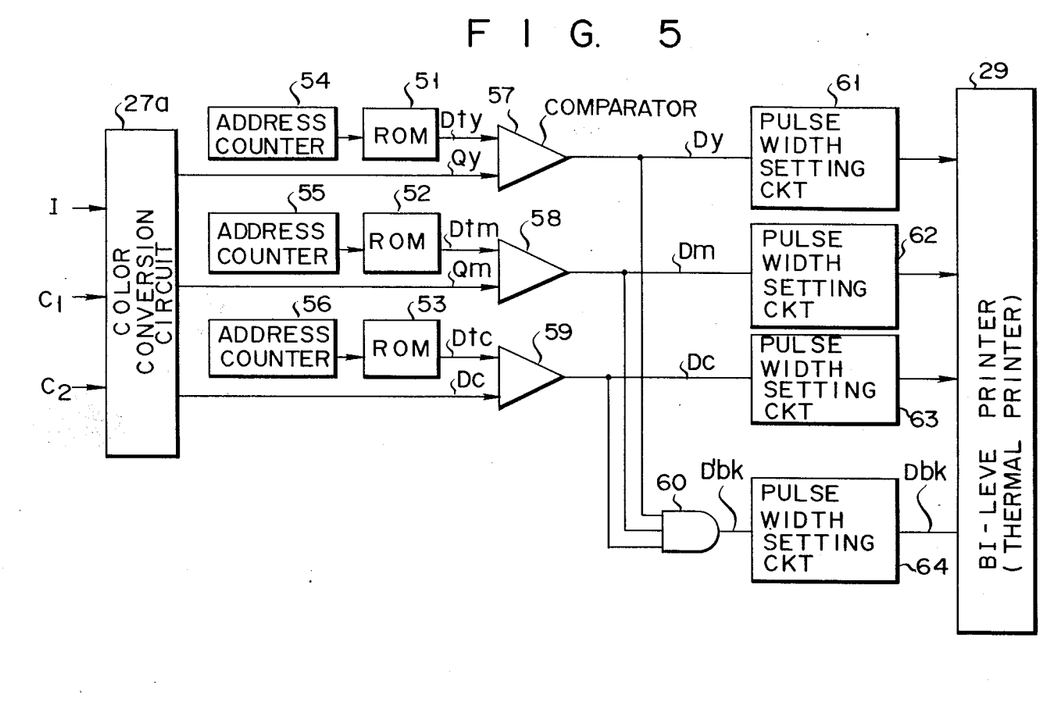
FIG. 5 shows an arrangement for carrying out the method shown in FIG. 4.

FIG. 5 shows an arrangement for carrying out the operation shown in FIG. 4 and described above. A color conversion circuit 29a is responsive to brightness signal I and color difference signals C1 and C2 to produce ink amount signals $Q_y$, $Q_m$, and $Q_c$ for yellow, magenta, and cyan. ROMs 51, 52 and 53 are provided which store dither threshold data in matrix patterns as shown in FIG. 4, for yellow, magenta, and cyan, respectively. ROMs 51, 52, and 53 are accessed by address counters 54, 55, and 56, respectively, to read out sequentially dither threshold data $D_{ty}$, $D_{tm}$, and $D_{tc}$ stored therein. Ink amount signals $Q_y$, $Q_m$, and $Q_c$ are respectively applied to comparators 57, 58, and 59 to which are respectively applied the dither threshold data $D_{ty}$, $D_{tm}$, and $D_{tc}$ from ROMs 51, 52, and 53, so that the dithered outputs $D_y$, $D_m$, and $D_c$ for yellow, magenta, and cyan inks are obtained as shown in FIG. 4. The dithered outputs $D_y$, $D_m$, $D_c$ for yellow, magenta, and cyan inks are applied through pulse width setting circuits 61, 62, 63 to bi-level color printer (thermal printer) 29 which comprises a driver and thermal head. Pulse width setting circuits 61, 62, 63 are arranged to set the pulse widths of drive pulses applied to thermal head, which determine the density of a printed image. The dithered outputs $D_y$, $D_m$, and $D_c$ of comparators 57, 58, and 59 are also applied to an AND gate 60 to produce the black ink signal $D'_{bk}$ as shown in FIG. 4, which is in turn applied through a pulse width setting circuit 64 to color printer 29. Pulse width setting circuit 64 is arranged to set the pulse width of a drive pulse to half that of the drive pulses set by pulse width setting circuits 61, 62, and 63, so that the black gradation compensation is effected. The black area printed with the black ink is effectively reduced by setting the pulse width of the drive pulse for printing the black ink to half the pulse width of the drive pulses for printing the yellow, magenta, and cyan inks.

With the abovementioned embodiment, color conversion circuit 27 is composed of a ROM table which stores ink amounts of four colors previously calculated. Alternatively, three color ink amounts may be obtained from a ROM table and then a black ink amount may be found from the three color ink amounts using a hardware.

Figure 6:
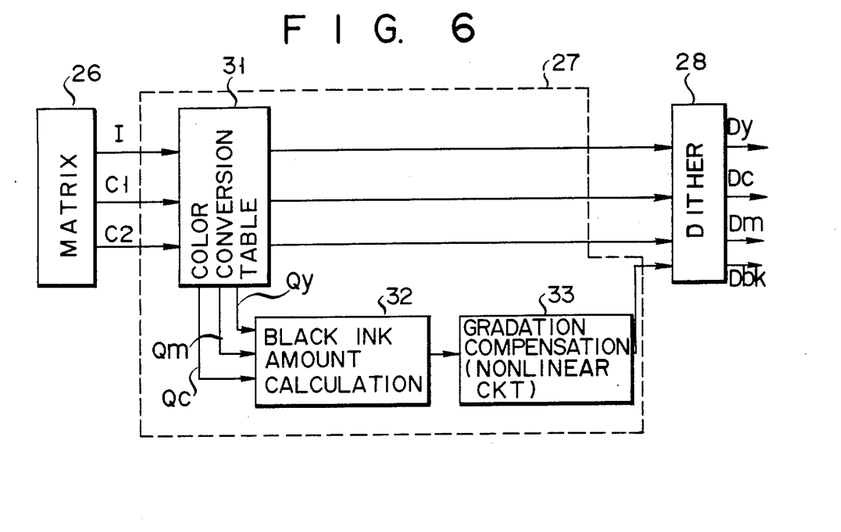
FIG. 6 is a block diagram of a color reproduction apparatus according to another embodiment of this invention.

In this case, as shown in FIG. 6, color conversion circuit 27 is comprised of color conversion table 31, black ink amount calculation section 32, and black area factor compensation circuit 33. Brightness signal I and color difference signals C1 and C2 from matrix circuit 26 are supplied to color conversion table 31 to be converted to three color ink amounts $Q_y$, $Q_m$, and $Q_c$. Stated in more detail, color conversion table 31 evaluates the dither output patterns for the respective colors from the respective color ink amounts $Q_y$, $Q_m$, and $Q_c$ to deliver respective outputs signals. On the other hand, black ink amount calculation section 32 evaluates from the color ink amount signals $Q_y$, $Q_m$, and $Q_c$ the corresponding black ink amount signal before black area factor compensation. This ink amount signal is compensated for by black area factor compensation (nonlinear) circuit 33 and supplied to dither circuit 28 where it is possible to obtain a full color image with the black gradation compensated.

In the respective embodiment the major portion of color conversion circuit 27, binary dither circuit 28, etc. can be embodied in the form of a ROM while retaining the advantage of the invention.

Although in the aforementioned embodiment the black ink ratio has been compensated for with the equation of $$BK' = (BK)^n,$$

this may be performed by the equation given by $$BK' = (2/\pi)\sin^{-1}(BK)$$

This conversion equation provides a downwards convex conversion curve and thus it is possible to obtain a similar advantage as set forth above.

This invention can be variously modified by varying the kinds and number of inks.

What is claimed is:

1. In a method for recording a full color image with the use of three reference color inks of yellow, magenta, and cyan, and a black ink, the black ink being last printed so as to be superimposed on an area in which all the reference color inks are superimposed, an area ratio BK of the black ink occupied relative to a pixel area in a unit pixel is set smaller than area ratios occupied by the respective reference inks superimposed within the unit pixel.

2. A thermal color printing method for recording a full color image by using three reference color inks of yellow, magenta, and cyan, and a black ink, said method comprising the steps of:

producing an electrical signal which defines respective amounts for the three reference color inks employed to print a unit pixel of the full color image;

detecting an overlapping area in which the three reference color links printed are superimposed with each other within the unit pixel; and printing a black ink on the three reference color inks in the unit pixel such that it is positioned substantially in said overlapping area and has a specific area which is set smaller than said overlapping area;

wherein an area ratio of the black ink to be printed in the unit pixel is set smaller than area ratios occupied by said reference color inks superimposed with each other in said overlapping area, to thereby define said specific area.

3. The method according to claim 1, wherein the area ratio BK of the black ink is set to a value which is proportional to the n-th ($n \leq 1$) power of a product of the area ratios of all the reference color inks superimposed within the unit pixel.

4. The method according to claim 1, wherein the area ratio BK of the black ink is determined by an equation given by $$BK = (2/\pi) \cdot \sin^{-1}(BK).$$

5. The method according to claim 1, wherein the reference color inks are yellow, magenta, and cyan.

* * * * *